United States Patent
Aizawa et al.

(10) Patent No.: US 11,148,592 B2
(45) Date of Patent: Oct. 19, 2021

(54) MOTORCYCLE DRIVING ASSISTANCE DEVICE

(71) Applicant: Mitsubishi Electric Corporation, Tokyo (JP)

(72) Inventors: Hiroshi Aizawa, Tokyo (JP); Keisuke Matsuo, Hyogo (JP)

(73) Assignee: Mitsubishi Electric Corporation, Tokyo (JP)

( * ) Notice: Subject to any disclaimer, the term of this patent is extended or adjusted under 35 U.S.C. 154(b) by 6 days.

(21) Appl. No.: 16/845,462

(22) Filed: Apr. 10, 2020

(65) Prior Publication Data
US 2020/0398750 A1 Dec. 24, 2020

(30) Foreign Application Priority Data
Jun. 20, 2019 (JP) .............................. JP2019-114333

(51) Int. Cl.
*B60Q 9/00* (2006.01)
*G08G 1/16* (2006.01)

(52) U.S. Cl.
CPC ............. *B60Q 9/008* (2013.01); *G08G 1/167* (2013.01); *B60Y 2200/12* (2013.01); *B60Y 2302/03* (2013.01); *B60Y 2400/90* (2013.01)

(58) Field of Classification Search
CPC .... B60Q 9/008; G08G 1/167; B60Y 2400/90; B60Y 2302/03; B60Y 2200/12;
(Continued)

(56) References Cited

U.S. PATENT DOCUMENTS 6,276,480 B1 * 8/2001 Aregger ............... B62D 31/003
180/213
6,311,123 B1 10/2001 Nakamura et al.
(Continued)

FOREIGN PATENT DOCUMENTS

JP     2001-14597 A     1/2001
JP     2001-505157 A     4/2001
(Continued)

OTHER PUBLICATIONS

Communication dated Sep. 1, 2020, from the Japanese Patent Office in Application No. 2019-114333, English Translation.
(Continued)

*Primary Examiner* — An T Nguyen
(74) *Attorney, Agent, or Firm* — Sughrue Mion, PLLC; Richard C. Turner

(57) ABSTRACT

A motorcycle driving assistance device includes: a curve traveling determination unit for determining whether or not an own vehicle is traveling on a curve; a radius-of-curvature calculation unit for, when it is determined that the own vehicle is traveling on a curve, calculating a radius of curvature of the curve; an other-vehicle lane estimation unit for comparing the radius of curvature and a distance between another vehicle and a center of curvature of the curve, and estimating a traveling lane of the other vehicle; and an alarm determination unit for determining whether or not output of an approach alarm is needed, on the basis of a distance between the own vehicle and the other vehicle, a relative velocity of the other vehicle, and a relationship between a traveling lane of the own vehicle and the traveling lane of the other vehicle.

16 Claims, 6 Drawing Sheets

(58) Field of Classification Search
CPC ... B62J 45/20; B62J 27/00; B62J 50/22; B62J 3/10; G01C 21/00; B60W 30/0953; B60W 30/143
See application file for complete search history.

(56) References Cited

U.S. PATENT DOCUMENTS

| | | | |
|---|---|---|---|
| 2002/0016663 A1 | 2/2002 | Nakamura et al. | |
| 2002/0032515 A1 | 3/2002 | Nakamura et al. | |
| 2002/0095246 A1* | 7/2002 | Kawazoe | G05D 1/0246 701/1 |
| 2012/0253596 A1* | 10/2012 | Ibrahim | G06K 9/00798 701/36 |
| 2013/0110391 A1* | 5/2013 | Obi | G01S 13/931 701/400 |
| 2013/0311075 A1* | 11/2013 | Tran | G08G 1/166 701/117 |
| 2014/0129086 A1* | 5/2014 | Takenaka | B62D 6/003 701/41 |
| 2015/0097661 A1* | 4/2015 | Nilsson | B62D 15/029 340/439 |
| 2015/0287324 A1 | 10/2015 | Schwindt et al. | |
| 2017/0158195 A1* | 6/2017 | Uchida | B62J 50/22 |
| 2017/0247054 A1* | 8/2017 | Lee | B62D 15/029 |
| 2020/0398750 A1* | 12/2020 | Aizawa | B62J 45/20 |

FOREIGN PATENT DOCUMENTS

| | | |
|---|---|---|
| JP | 2001-228248 A | 8/2001 |
| JP | 2007-148964 A | 6/2007 |
| JP | 2016-119247 A | 6/2016 |
| JP | 2017-511540 A | 4/2017 |

OTHER PUBLICATIONS

Communication dated Mar. 30, 2021, issued by the Japanese Patent Office in application No. 2019-114333.

* cited by examiner

MOTORCYCLE DRIVING ASSISTANCE DEVICE

BACKGROUND OF THE INVENTION

1. Field of the Invention

The present disclosure relates to a motorcycle driving assistance device.

2. Description of the Background Art

In a motorcycle driving assistance device as proposed conventionally, an electronic control unit (ECU) calculates the possibility that an incident such as collision will occur, on the basis of sensor information obtained by a sensor monitoring the features of the surroundings, and when the possibility exceeds a threshold value, an alarm is indicated to a driver (see, for example, Patent Document 1).
Patent Document 1: US Patent application publication No. 2013/0311075

In order to calculate the possibility of collision with another vehicle, it is necessary to find the relationship between a traveling lane of the own vehicle and a traveling lane of the other vehicle. When the own vehicle is traveling on a straight road, it is possible to find the traveling lane of the other vehicle on the basis of the distance to the other vehicle and the angle thereof, and therefore it is possible to find the relationship between the traveling lane of the own vehicle and the traveling lane of the other vehicle on the basis of sensor information of a detection sensor detecting the position of the other vehicle. On the other hand, when traveling on a curve, the curvature of the curve in traveling also influences the relationship between the traveling lane of the own vehicle and the traveling lane of the other vehicle. Therefore, in some cases, it is impossible to accurately grasp the relationship between the traveling lane of the own vehicle and the traveling lane of the other vehicle from only information obtained by the detection sensor. Thus, there is a case where the possibility of collision with the other vehicle cannot be accurately calculated and an alarm indicating that the other vehicle is approaching cannot be properly outputted.

SUMMARY OF THE INVENTION

The present disclosure has been made to solve the above problem, and an object of the present disclosure is to provide a motorcycle driving assistance device capable of properly outputting an alarm indicating that another vehicle is approaching during traveling on a curve.

A motorcycle driving assistance device according to the present disclosure is a motorcycle driving assistance device including: a curve traveling determination unit configured to determine whether or not an own vehicle is traveling on a curve, on the basis of a lean angle of the own vehicle; a radius-of-curvature calculation unit configured to, when it is determined that the own vehicle is traveling on a curve, calculate a radius of curvature of the curve on the basis of the lean angle and a velocity of the own vehicle; an other-vehicle lane estimation unit configured to compare the radius of curvature and a distance between another vehicle that is an approach determination target and a center of curvature of the curve, and estimate a traveling lane of the other vehicle; and an alarm determination unit configured to determine whether or not an approach alarm regarding the other vehicle is needed, on the basis of a distance between the own vehicle and the other vehicle, a relative velocity of the other vehicle relative to the own vehicle, and a relationship between a traveling lane of the own vehicle and the traveling lane of the other vehicle.

The motorcycle driving assistance device according to the present disclosure is capable of properly outputting an alarm indicating that another vehicle is approaching during traveling on a curve.

DETAILED DESCRIPTION OF THE PREFERRED EMBODIMENTS OF THE INVENTION

First Embodiment

Figure 1:
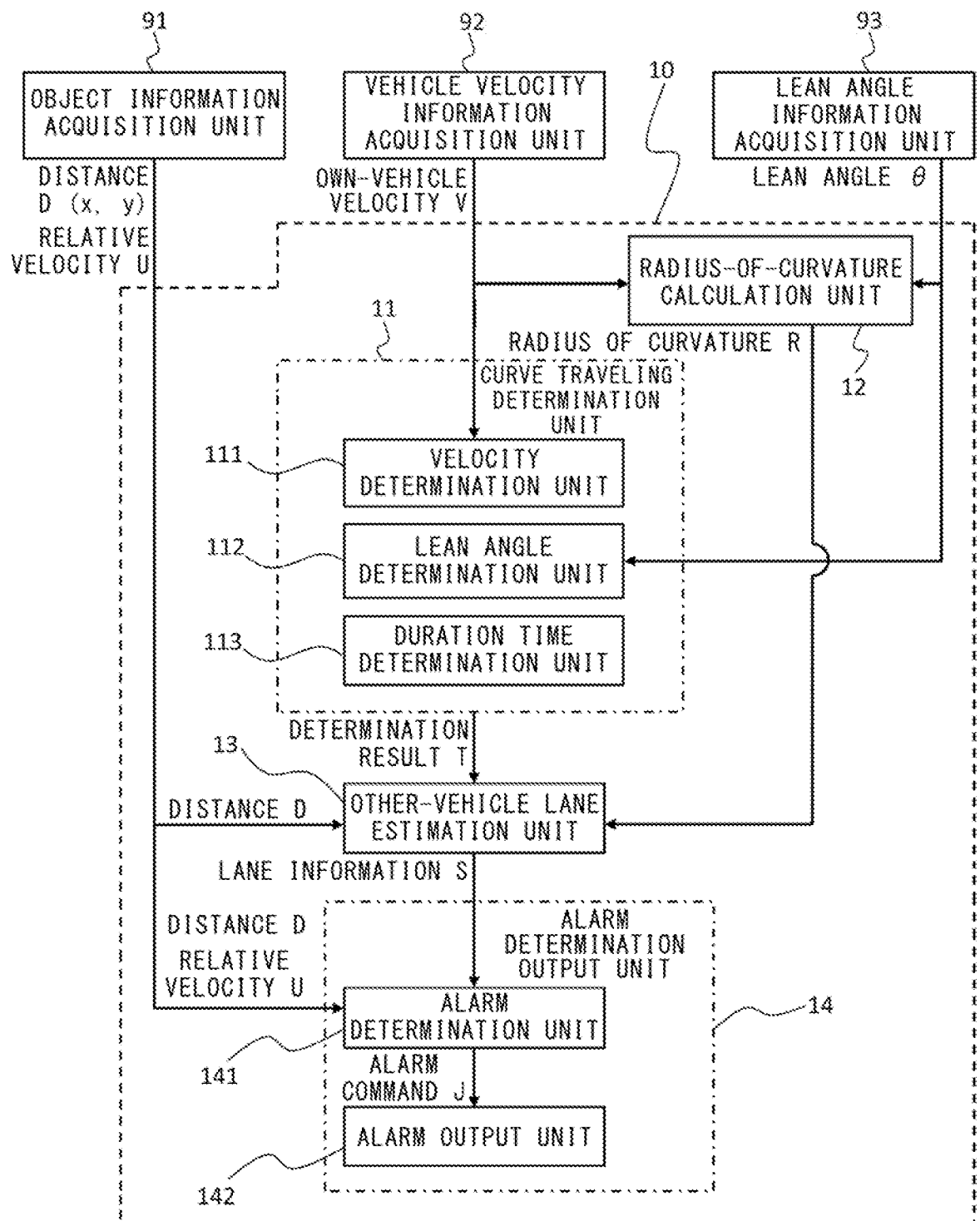
FIG. 1 is a block diagram showing the configuration of a motorcycle driving assistance device according to the first embodiment of the present disclosure.
Figure 2:
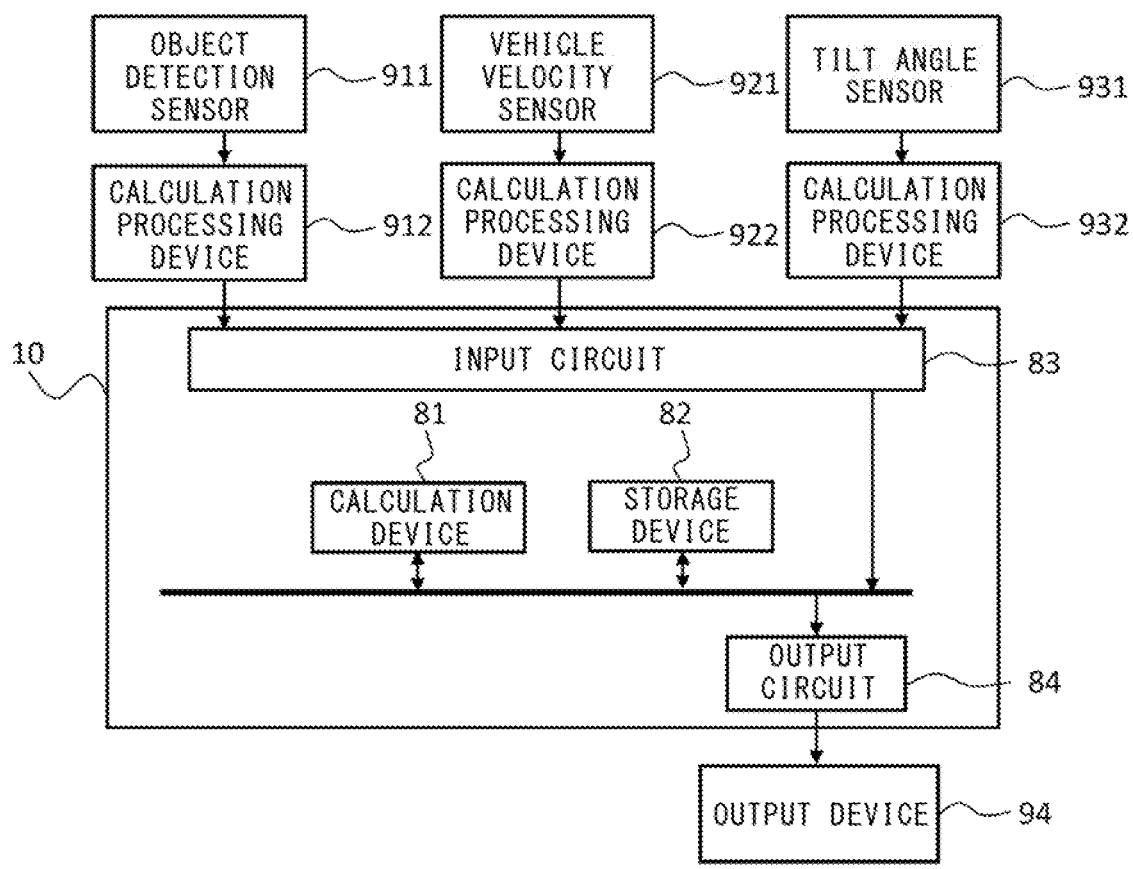
FIG. 2 is a diagram showing the hardware configuration of the motorcycle driving assistance device according to the first embodiment.

Hereinafter, the first embodiment of the present disclosure will be described with reference to FIG. 1 to FIG. 7. FIG. 1 is a block diagram showing the configuration of a motorcycle driving assistance device according to the first embodiment, and FIG. 2 is a diagram showing the hardware configuration thereof. A motorcycle driving assistance device 10 includes: a curve traveling determination unit 11 for determining a curve traveling state of an own vehicle which is a motorcycle; a radius-of-curvature calculation unit 12 for calculating a radius of curvature R of a curve on which the own vehicle is traveling; an other-vehicle lane estimation unit 13 for estimating a traveling lane of another vehicle detected by an object detection sensor; and an alarm determination output unit 14 which performs other-vehicle approach determination and outputs an alarm when it is determined that another vehicle that is an approach determination target is approaching the own vehicle.

On the basis of an own-vehicle velocity V and a lean angle θ of the own vehicle, the curve traveling determination unit 11 determines a curve traveling state of the own vehicle, and outputs a result thereof as a determination result T. Here, the term "curve traveling state" includes whether or not the own vehicle is traveling on a curve, and whether or not the own vehicle is traveling on a right curve or a left curve. In the case of a motorcycle, the vehicle body leans to the inner side of a curve during traveling on the curve, and therefore the curve traveling state is determined from the lean angle θ. The curve traveling determination unit 11 includes: a velocity determination unit 111 for determining whether or not the own-vehicle velocity V is equal to or greater than a predetermined velocity; and a lean angle determination unit 112 for determining whether or not the lean angle θ is equal to or greater than a predetermined positive angle, and whether or not the lean angle θ is equal to or smaller than a predetermined negative angle. The curve traveling determination unit 11 further includes a duration time determination unit 113 for determining whether or not a state in which the own-vehicle velocity V and the lean angle θ satisfy the above conditions has continued for a predetermined period.

The radius-of-curvature calculation unit 12 calculates the radius of curvature R of a curve on which the own vehicle is traveling, on the basis of the own-vehicle velocity V and the lean angle θ. A method for calculating the radius of curvature R by the radius-of-curvature calculation unit 12 will be described later.

On the basis of the determination result T for the curve traveling state, a distance D to the other vehicle that is the approach determination target, and the radius of curvature R, the other-vehicle lane estimation unit 13 estimates the traveling lane of the other vehicle that is the approach determination target, and outputs a result thereof as lane information S. A method for estimating the traveling lane of the other vehicle by the other-vehicle lane estimation unit 13 will be described later.

The alarm determination output unit 14 includes: an alarm determination unit 141 which determines whether or not the other vehicle is approaching and whether or not an alarm is needed, on the basis of the distance D, a relative velocity U, and the lane information S, and outputs an alarm command J when it is determined that the alarm is needed; and an alarm output unit 142 for outputting the alarm in accordance with the alarm command J.

An object information acquisition unit 91 detects an object around the own vehicle, and acquires information such as the distance to the detected object and the direction thereof. The term "object" includes something that has a possibility of colliding with the own vehicle, e.g., another vehicle, a person, or an obstacle. In the first embodiment, the "object" is assumed to be another vehicle that is an approach determination target. The object information acquisition unit 91 acquires the distance D from the own vehicle to the other vehicle, and the relative velocity U of the other vehicle relative to the own vehicle. The distance D is composed of an x-direction distance and a y-direction distance. As described later, the x direction is the radial direction of the circle of curvature of a curve on which the own vehicle is traveling, and the y direction is the circumferential direction thereof. More specifically, the radial direction at the own vehicle position on the circumference of the circle of curvature is the x direction, and the circumferential direction thereof is the y direction. Since the distance D is composed of the x-direction distance and the y-direction distance, the direction from the own vehicle to the other vehicle can also be acquired from the distance D. In addition, the object information acquisition unit 91 acquires the relative velocity U of the other vehicle relative to the own vehicle. The object information acquisition unit 91 outputs the distance D to the other-vehicle lane estimation unit 13, and outputs the distance D and the relative velocity U to the alarm determination unit 141.

A vehicle velocity information acquisition unit 92 acquires the own-vehicle velocity V which is the velocity of the own vehicle, and outputs the own-vehicle velocity V to the velocity determination unit 111 and the radius-of-curvature calculation unit 12. A lean angle information acquisition unit 93 acquires the lean angle θ which is the tilt angle of the own vehicle, and outputs the lean angle θ to the radius-of-curvature calculation unit 12 and the lean angle determination unit 112.

The function units shown in FIG. 1 are implemented by the hardware configuration shown in FIG. 2. It is noted that the hardware configuration shown in FIG. 2 is merely an example, and another configuration may be employed. The motorcycle driving assistance device 10 includes a calculation device 81 and a storage device 82. The various functions of the motorcycle driving assistance device 10, i.e., determination by the curve traveling determination unit 11, calculation by the radius-of-curvature calculation unit 12, estimation by the other-vehicle lane estimation unit 13, determination by the alarm determination output unit 14, and input/output processing accompanying these functions, are implemented by the calculation device 81 executing a program (not shown) stored in the storage device 82. The storage device 82 stores data such as input/output data or calculation results as necessary. The calculation device 81 includes, for example, a central processing unit (CPU), an application specific integrated circuit (ASIC), a digital signal processor (DSP), a field programmable gate array (FPGA), and various logic circuits and signal processing circuits. The storage device 82 includes a read only memory (ROM) which is readable from the calculation device 81, a random access memory (RAM) which is readable and writable from the calculation device 81, and the like.

The motorcycle driving assistance device 10 further includes an input circuit 83 which receives an input of data from outside or the like, and an output circuit 84 which outputs data or the like to outside. The calculation device 81 and the storage device 82 acquire data or the like from the object information acquisition unit 91, the vehicle velocity information acquisition unit 92, and the lean angle information acquisition unit 93 via the input circuit 83, and outputs alarm data or the like to an external output device 94 via the output circuit 84.

The object information acquisition unit 91 is realized by an object detection sensor 911 such as a millimeter-wave radar for detecting an object by radio waves, and a calculation processing device 912 which performs calculation processing on sensor data acquired by the object detection sensor 911, to calculate the distance and the direction from the own vehicle to the object and the relative velocity of the object relative to the own vehicle. The object detection sensor 911 is not limited to a radio-wave-based sensor, but may be an optical sensor such as a laser radar or may be an ultrasonic sensor. Alternatively, an optical camera may be used as the object detection sensor 911. In the case of using an optical camera, the calculation processing device 912 performs image processing on an image taken by the optical camera, to calculate the distance to the object, or the like. In the first embodiment, the other vehicle that is the approach determination target is detected as an object, and the distance D to the other vehicle and the relative velocity U thereof are calculated. The data (distance D and relative velocity U) calculated by the calculation processing device 912 are inputted to the calculation device 81 or the storage device 82 via the input circuit 83.

The vehicle velocity information acquisition unit 92 is realized by a vehicle velocity sensor 921 such as a wheel velocity sensor mounted to the own vehicle, and a calculation processing device 922 which performs calculation processing on sensor data acquired by the vehicle velocity sensor 921, to calculate the own-vehicle velocity V. The vehicle velocity sensor 921 may be replaced with a global positioning system (GPS), and the own-vehicle velocity V may be calculated from temporal change in position data of the own vehicle acquired by the GPS. The own-vehicle velocity V calculated by the calculation processing device 922 is inputted to the calculation device 81 or the storage device 82 via the input circuit 83.

The lean angle information acquisition unit 93 is realized by a tilt angle sensor 931 which is mounted to the own vehicle and detects the tilt angle of the own vehicle, and a calculation processing device 932 which performs calculation processing on sensor data acquired by the tilt angle sensor 931, to calculate the lean angle θ. As the tilt angle sensor 931, at least one of an angular velocity sensor and an acceleration sensor is used, for example. Alternatively, an optical camera may be used as the tilt angle sensor 931. In the case of using an optical camera, the calculation processing device 932 compares an image of the own vehicle that is standing erect and an image of the own vehicle that is tilted, and calculates the lean angle θ from the slope of a horizontal line in the image. The lean angle θ calculated by the calculation processing device 932 is inputted to the calculation device 81 or the storage device 82 via the input circuit 83.

The alarm output unit 142 is realized by the calculation device 81 and the output circuit 84. The output circuit 84 outputs alarm data according to the alarm command J to the output device 94. The output device 94 that has received the alarm data outputs an alarm that can be recognized by a driver of the own vehicle. The output device 94 may be, for example, a display device which is provided on a meter or the like of the own vehicle and displays an alarm image. Another example of the output device 94 is a combination of an intercom which is provided in a helmet of the driver of the own vehicle and emits an alarm sound to the driver, and a transmitter which transmits alarm information to the intercom by wireless communication means such as Bluetooth (registered trademark).

It is noted that the object information acquisition unit 91, the vehicle velocity information acquisition unit 92, and the lean angle information acquisition unit 93 may be included in the motorcycle driving assistance device 10, so as to be configured as one unit. In this case, space saving is achieved as a whole. Since the own vehicle which is a motorcycle is smaller as compared to a four-wheeled vehicle and has a less mounting space, unitization as described above facilitates mounting to the own vehicle.

Figure 3:
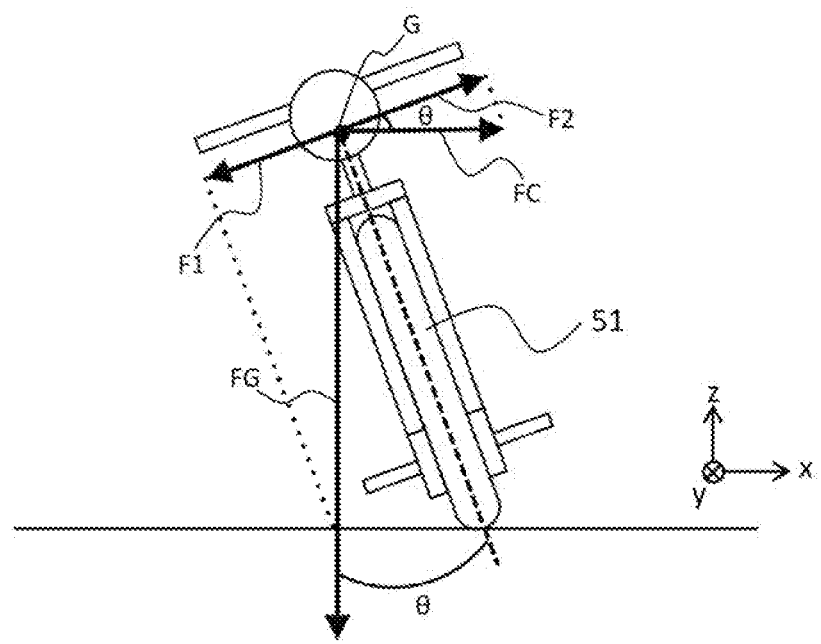
FIG. 3 illustrates the balance relationship between forces applied to an own vehicle during traveling on a curve.

Next, calculation of the radius of curvature R by the radius-of-curvature calculation unit 12 will be described. On the basis of the balance between gravity and a centrifugal force applied to the own vehicle during traveling on a curve, the radius-of-curvature calculation unit 12 calculates the radius of curvature R of the curve. FIG. 3 illustrates the balance relationship between forces applied to the own vehicle during traveling on a curve. In FIG. 3, a driver of the own vehicle is not shown. In FIG. 3, the coordinate axes are set as follows. That is, the radial direction of the circle of curvature of a curve on which an own vehicle 51 is traveling is set as x direction, the circumferential direction is set as y direction, and the vertical direction is set as z direction. In the x direction, an outward direction is defined as positive. In the y direction, a direction from the near side to the deep side in the drawing is defined as positive. In the z direction, a vertically upward direction is defined as positive. The own vehicle 51 in FIG. 3 is traveling on a right curve, and the advancing direction thereof is −y direction. During traveling on the curve, gravity FG in −z direction and a centrifugal force FC in +x direction are applied to a center of gravity G between the own vehicle 51 and the driver.

The own vehicle 51 which is a motorcycle is traveling on the curve while the vehicle body is tilted to the inner side of the curve. The tilt of the vehicle body of the own vehicle 51 at this time is the lean angle θ. In FIG. 3, the lean angle θ when the driver tilts the vehicle body to the right side (in FIG. 3, left side) is defined as positive, and the lean angle θ when the driver tilts the vehicle body to the left side (in FIG. 3, right side) is defined as negative. When the vehicle body is tilted, the gravity FG acts in a direction of causing the own vehicle 51 to fall. When the gravity FG is resolved into a force F1 in the direction of causing the vehicle body to fall and a force in a direction perpendicular to F1, the force F1 in the direction of causing the vehicle body to fall is represented by Expression (1). In Expression (1), m is the sum of the weights of the own vehicle 51 and the driver, and g is the gravitational acceleration (about 9.8 m/s²) on the earth.

[Mathematical 1]

$$F_1 = mg \sin|\theta| \qquad (1)$$

On the other hand, the centrifugal force FC acts in a direction of raising the own vehicle 51. When the centrifugal force FC is resolved into a force F2 in the direction of raising the vehicle body and a force in a direction perpendicular to F2, the force F2 in the direction of raising the vehicle body is represented by Expression (2).

[Mathematical 2]

$$F_2 = m \frac{V^2}{R} \cos|\theta| \qquad (2)$$

When the own vehicle 51 turns through the curve while the vehicle body is tilted, the force F1 to cause the vehicle body to fall and the force F2 to raise the vehicle body are balanced, so that F1=F2 is satisfied. By solving this for the radius of curvature R, Expression (3) is obtained. Thus, it is found that the radius of curvature R can be calculated from the own-vehicle velocity V and the lean angle θ. The radius-of-curvature calculation unit 12 calculates the radius of curvature R by using Expression (3).

[Mathematical 3]

$$R = \frac{V^2}{g \tan|\theta|} \qquad (3)$$

It is noted that positive and negative directions of the coordinate axes and the lean angle shown in the first embodiment are merely an example, and may be defined in another way. For example, the lean angle θ when the driver tilts the vehicle body to the left side may be defined as positive, and the lean angle θ when the driver tilts the vehicle body to the right side may be defined as negative.

Next, a method for estimating a lane of another vehicle by the other-vehicle lane estimation unit 13 will be described with reference to FIG. 4. In the example shown in FIG. 4, rearward detected vehicles 52A, 52B that are traveling at the rear of the own vehicle 51 are other vehicles that are approach determination targets, and traveling lanes of the rearward detected vehicles 52A, 52B are to be estimated. The own vehicle 51 and the rearward detected vehicles 52A, 52B are traveling on a right curve. The setting of the coordinate axes is the same as in FIG. 3, and the z axis is not shown in the drawing. The attachment position of the object detection sensor 911 attached at a rear part of the own vehicle 51 is defined as origin O. The radius of curvature of the right curve on which the own vehicle 51 is traveling is denoted by R. In this case, the coordinates of a center of curvature C is (−R, 0). The positions and the velocities of the rearward detected vehicles 52A, 52B are detected by the object detection sensor 911 attached at the rear part of the own vehicle 51.

The rearward detected vehicle 52A is traveling on a left rear side of the own vehicle 51. That is, the rearward detected vehicle 52A is traveling on an outer side of the curve with respect to the own vehicle 51, at the rear of the own vehicle 51. It is noted that, for specifying the position coordinates of the rearward detected vehicle 52A, a point A on the rearward detected vehicle 52A that is closest to the own vehicle 51 is used. That is, the position coordinates of the point A are defined as the position coordinates of the rearward detected vehicle 52A. In the example shown in FIG. 4, the position coordinates of the point A are set as (x1, y1). The rearward detected vehicle 52B is traveling on the right rear side of the own vehicle 51. That is, the rearward detected vehicle 52B is traveling on an inner side of the curve with respect to the own vehicle 51, at the rear of the own vehicle 51. It is noted that, for specifying the position coordinates of the rearward detected vehicle 52B, a point B on the rearward detected vehicle 52B that is closest to the own vehicle 51 is used. That is, the position coordinate of the point B is defined as the position coordinates of the rearward detected vehicle 52B. In the example shown in FIG. 4, the position coordinates of the point B are set as (−x2, y2).

A lane width W of each of a traveling lane 61 of the own vehicle 51, a left adjacent lane 62A adjacent to the traveling lane 61, and a right adjacent lane 62B adjacent to the traveling lane 61 can be set to a maximum value prescribed in regulations, for example. In Japan, the maximum value is 3.5 m. In the case where a camera is mounted on the own vehicle 51, a white line on the boundary between the traveling lane 61 and the left adjacent lane 62A and a white line on the boundary between the traveling lane 61 and the right adjacent lane 62B may be detected by the camera, and the interval between the two white lines may be calculated to obtain the lane width W. The traveling lane 61, the left adjacent lane 62A, and the right adjacent lane 62B may have different lane widths. In the right curve as shown in FIG. 4, the left adjacent lane 62A is an outer adjacent lane, and the right adjacent lane 62B is an inner adjacent lane.

Estimation for the traveling lanes of the rearward detected vehicles 52A, 52B is performed by comparing the radius of curvature R and the distance between the center of curvature C and each rearward detected vehicle 52A, 52B. A distance R1 between the center of curvature C and the rearward detected vehicle 52A and a distance R2 between the center of curvature C and the rearward detected vehicle 52B are the lengths of hypotenuses of right triangles AMC, BNC, respectively, and therefore are represented by Expression (4) and Expression (5).

[Mathematical 4]

$$R_1 = \sqrt{(R+x_1)^2 + y_1^2} \tag{4}$$

[Mathematical 5]

$$R_2 = \sqrt{(R-x_2)^2 + y_2^2} \tag{5}$$

On the basis of a difference between the distance R1 and the radius of curvature R, the traveling lane of the rearward detected vehicle 52A is estimated as follows.

In the case where the difference between the distance R1 and the radius of curvature R is not greater than a threshold value h as shown in Expression (6), it is estimated that the rearward detected vehicle 52A is traveling on the same traveling lane 61 as the own vehicle 51. The threshold value h is a positive value smaller than the lane width W, and is set as appropriate in consideration of severity of approach determination, or the like.

[Mathematical 6]

$$R_1 - R \leq h \tag{6}$$

In the case where the difference between the distance R1 and the radius of curvature R is greater than the threshold value h and is not greater than the sum of the lane width W and the threshold value h as shown in Expression (7), it is estimated that the rearward detected vehicle 52A is traveling on the left adjacent lane 62A (outer adjacent lane).

[Mathematical 7]

$$h < R_1 - R \leq W + h \tag{7}$$

In the case where the difference between the distance R1 and the radius of curvature R is greater than the sum of the lane width W and the threshold value h as shown in Expression (8), it is estimated that the rearward detected vehicle 52A is traveling on a lane further leftward (outward) of the left adjacent lane 62A.

[Mathematical 8]

$$R_1 - R > W + h \tag{8}$$

On the basis of a difference between the distance R2 and the radius of curvature R, the traveling lane of the rearward detected vehicle 52B is estimated as follows. It is noted that R2 is smaller than R and therefore the absolute value of the difference between R2 and R is used as a determination reference.

In the case where the absolute value of the difference between the distance R2 and the radius of curvature R is not greater than the threshold value h as shown in Expression (9), it is estimated that the rearward detected vehicle 52B is traveling on the same traveling lane 61 as the own vehicle 51.

[Mathematical 9]

$$|R_2 - R| \leq h \tag{9}$$

In the case where the absolute value of the difference between the distance R2 and the radius of curvature R is greater than the threshold value h and is not greater than the sum of the lane width W and the threshold value h as shown in Expression (10), it is estimated that the rearward detected vehicle 52B is traveling on the right adjacent lane 62B (inner adjacent lane) adjacent to the traveling lane 61.

[Mathematical 10]

$$h \leq |R_2 - R| \leq W + h \tag{10}$$

In the case where the absolute value of the difference between the distance R2 and the radius of curvature R is greater than the sum of the lane width W and the threshold value h as shown in Expression (11), it is estimated that the rearward detected vehicle 52B is traveling on a lane further rightward (inward) of the right adjacent lane 62B.

[Mathematical 11]

$$|R_2-R|>W+h \quad (11)$$

It is noted that the threshold value h may be different among Expressions (6) to (11).

Figure 4:
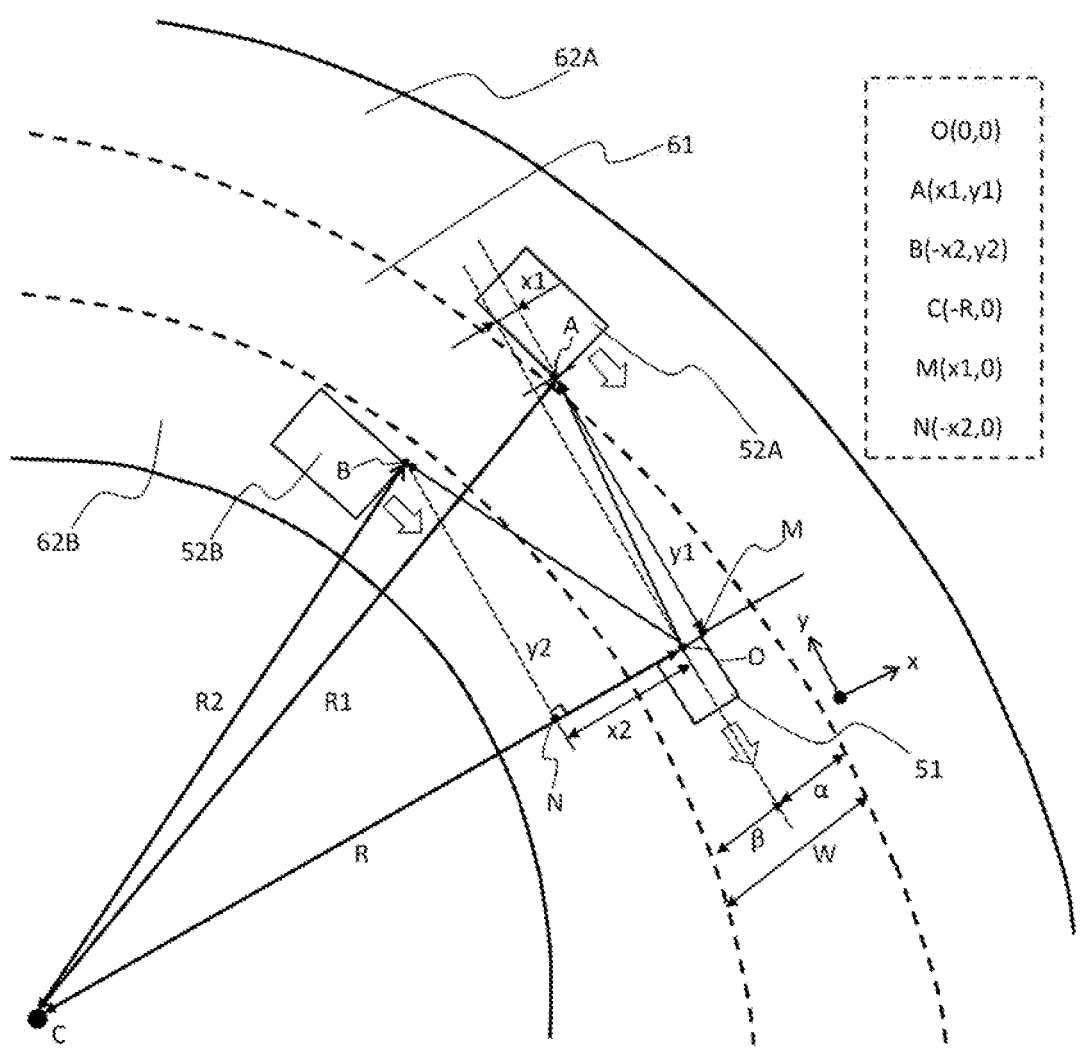
FIG. 4 illustrates a method for estimating a lane of another vehicle that is an approach determination target in the first embodiment.

In the example shown in FIG. 4, the own vehicle 51 and the rearward detected vehicles 52A, 52B are traveling on a right curve. However, the above lane estimation method can also be applied to the case of traveling on a left curve. In the case of a left curve, the left adjacent lane is an inner adjacent lane, and the right adjacent lane is an outer adjacent lane. In the example shown in FIG. 4, the other vehicles are traveling at the rear of the own vehicle. However, if the object detection sensor 911 is attached to a front part of the own vehicle, the above lane estimation method can also be applied to the case where the other vehicles are traveling at the front of the own vehicle. In essence, depending on the positional relationship between the own vehicle and another vehicle, calculation is performed as follows. For another vehicle that is traveling on the outer side (left side in a right curve or right side in a left curve) with respect to the own vehicle, the distance from the center of curvature is calculated using Expression (4), and lane estimation is performed using Expressions (6), (7), (8). For another vehicle that is traveling on the inner side (right side in a right curve or left side in a left curve) with respect to the own vehicle, the distance from the center of curvature is calculated using Expression (5), and lane estimation is performed using Expressions (9), (10), (11).

In addition, in lane estimation for another vehicle, the position where the own vehicle 51 is traveling, on the traveling lane 61 may be taken into consideration. For example, the position where the own vehicle 51 is traveling, on the traveling lane 61 is calculated on the basis of a combination of map data of a car navigation system and data of a GPS, and a distance α between the own vehicle 51 and the left adjacent lane 62A and a distance β between the own vehicle 51 and the right adjacent lane 62B are calculated. The distance α and the distance β may be calculated by detecting a white line on the boundary between the traveling lane 61 and the left adjacent lane 62A and a white line on the boundary between the traveling lane 61 and the right adjacent lane 62B by a camera, and calculating the distance between each white line and the own vehicle 51. While the distance between the own vehicle 51 and each adjacent lane is grasped as described above, the threshold value h is adjusted accordingly, whereby the traveling lanes of the rearward detected vehicles 52A, 52B can be accurately estimated.

Figure 5:
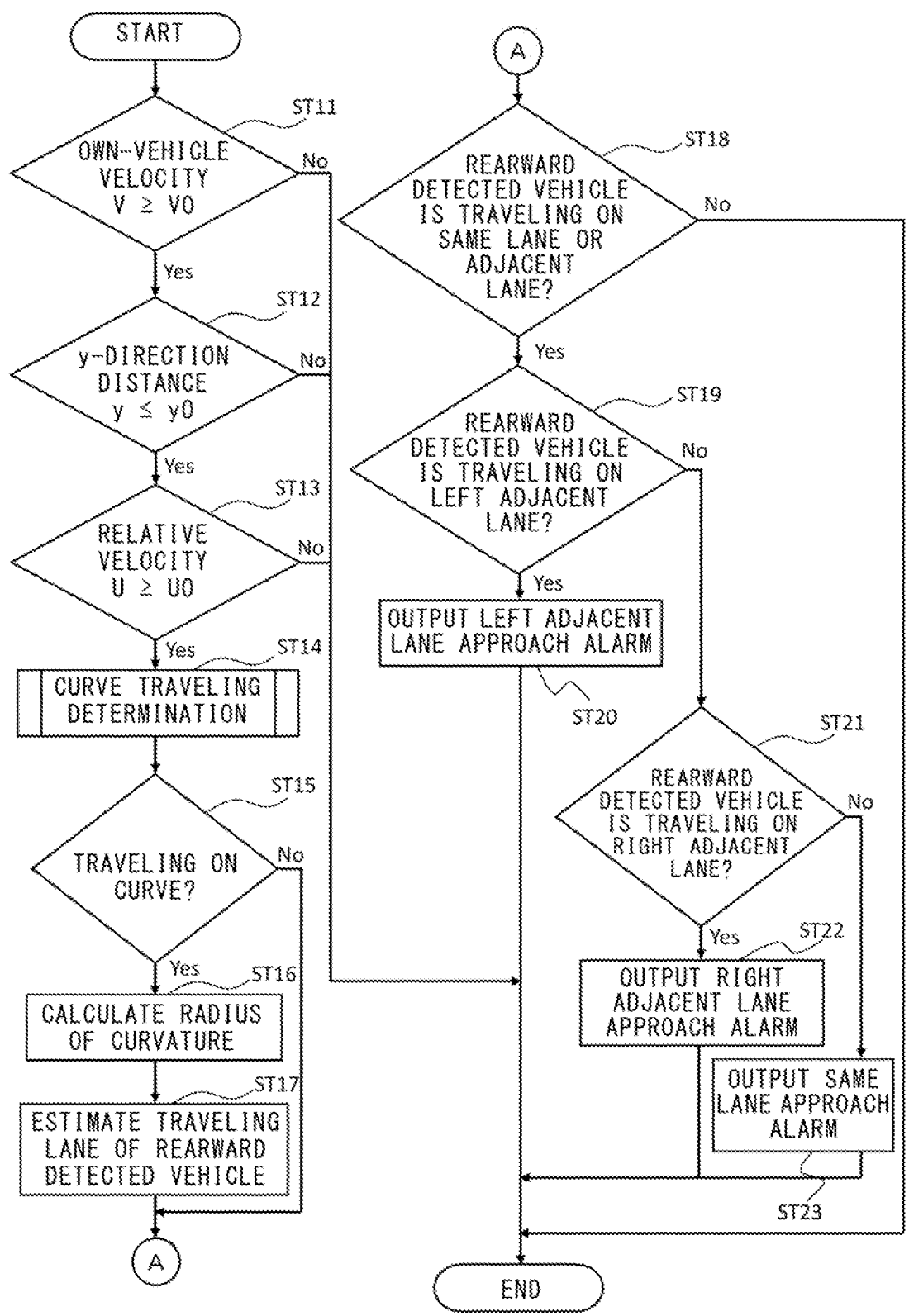
FIG. 5 is a flowchart showing operation of the motorcycle driving assistance device according to the first embodiment.

Next, operation will be described. FIG. 5 is a flowchart showing operation of the motorcycle driving assistance device according to the first embodiment. The operation shown in FIG. 5 is operation in the example shown in FIG. 4, i.e., in the case where the own vehicle is traveling on a right curve and another vehicle that is an approach determination target is traveling at the rear of the own vehicle. However, the same operation applies also in the case of traveling on a left curve and the case where another vehicle that is an approach determination target is traveling at the front of the own vehicle. First, the alarm determination unit 141 determines whether or not the own-vehicle velocity V acquired by the vehicle velocity information acquisition unit 92 is equal to or greater than a predetermined velocity V0 (step ST11). If the own-vehicle velocity V is equal to or greater than the velocity V0, the process proceeds to step ST12, and if the own-vehicle velocity V is smaller than the velocity V0, the process is ended.

Next, the alarm determination unit 141 determines whether or not a y-direction distance from the own vehicle 51 to each rearward detected vehicle 52A, 52B is equal to or smaller than a predetermined threshold value y0 (step ST12). As is found from FIG. 4, the y-direction distance from the own vehicle 51 to the rearward detected vehicle 52A, 52B corresponds to the magnitude of the y coordinate thereof. That is, the y-direction distance from the own vehicle 51 to the rearward detected vehicle 52A is y1 (y=y1), and the y-direction distance from the own vehicle 51 to the rearward detected vehicle 52B is y2 (y=y2). If the y-direction distance is equal to or smaller than the threshold value y0, the process proceeds to step ST13. If the y-direction distance is greater than the threshold value y0, it is determined that an approach alarm is not needed, and the process is ended. It is noted that, since the distance D is composed of the x-direction distance and the y-direction distance as described above, the y-direction distance can be acquired from the distance D. In this way, in the first embodiment, the distance D is not directly used as a determination reference but the y-direction distance included in the distance D is used as a determination reference. It is noted that the distance D may be used as a determination reference.

Next, the alarm determination unit 141 determines whether or not the relative velocity U of the rearward detected vehicle 52A, 52B relative to the own vehicle 51 is equal to or greater than the predetermined velocity U0 (step ST13). The relative velocity U is acquired by the object information acquisition unit 91. If the relative velocity U is equal to or greater than the velocity U0, the process proceeds to step ST14. If the relative velocity U is smaller than the velocity U0, it is determined that an approach alarm is not needed, and the process is ended.

Figure 6:
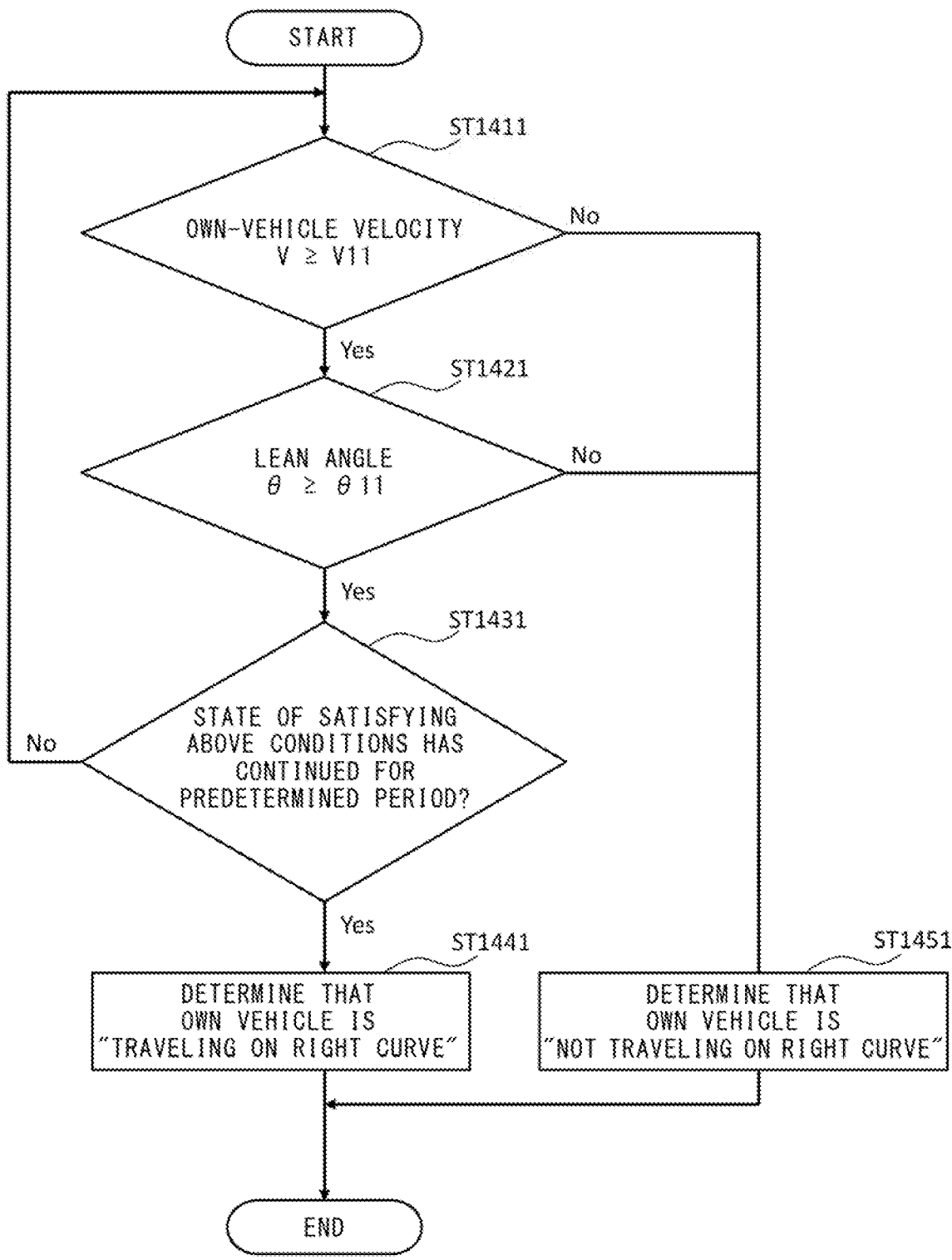
FIG. 6 is a flowchart illustrating determination for a curve traveling state according to the first embodiment, and shows operation in the case of determination for right curve traveling.
Figure 7:
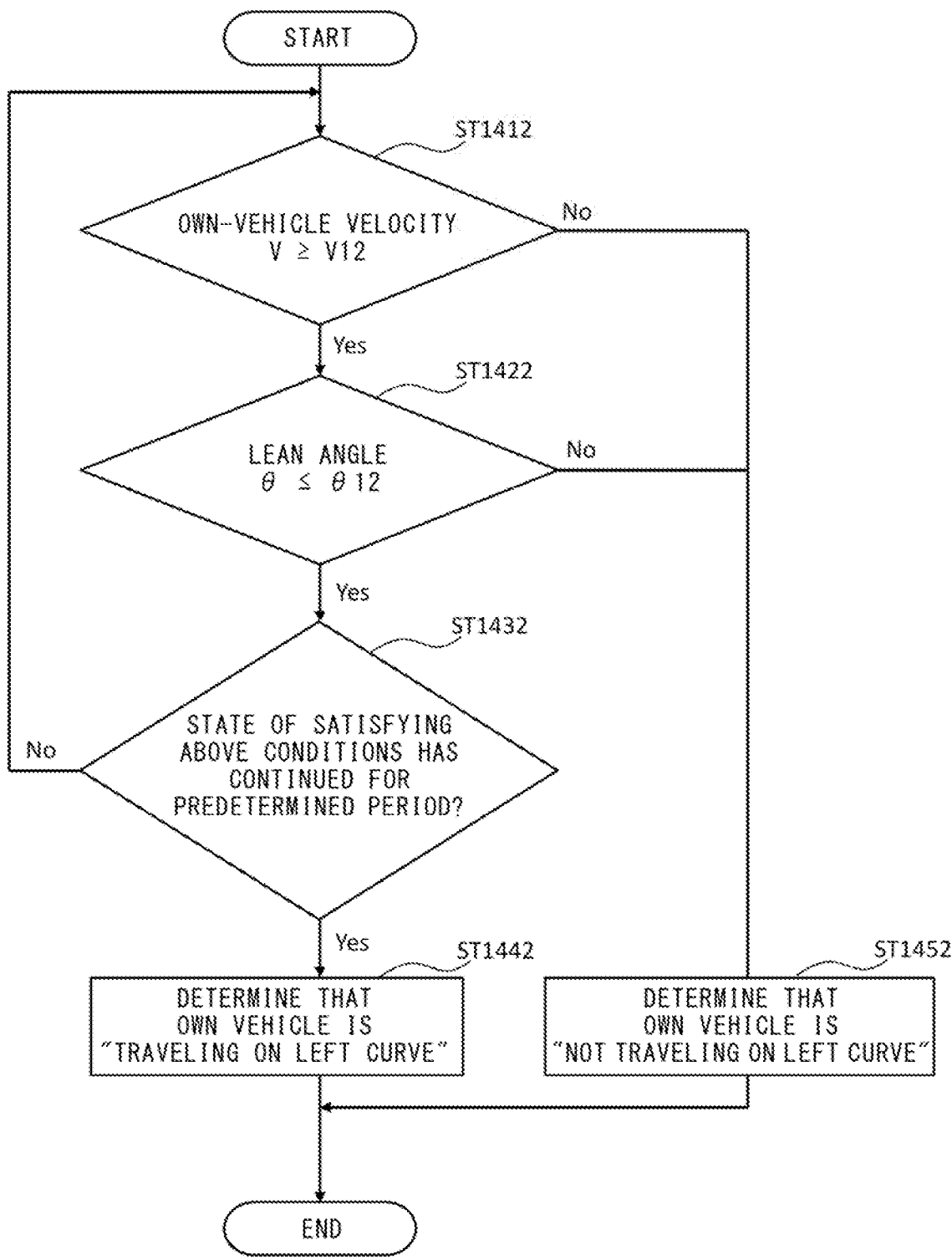
FIG. 7 is a flowchart illustrating determination for a curve traveling state according to the first embodiment, and shows operation in the case of determination for left curve traveling.

Next, the curve traveling determination unit 11 determines the curve traveling state of the own vehicle 51 (step ST14). FIG. 6 and FIG. 7 are flowcharts illustrating determination for the curve traveling state according to the first embodiment. FIG. 6 shows operation in the case of determination for traveling on a right curve, and FIG. 7 shows operation in the case of determination for traveling on a left curve. A result of determination by the curve traveling determination unit 11 is outputted as the determination result T.

In the case of performing determination for traveling on a right curve, as shown in FIG. 6, first, the velocity determination unit 111 determines whether or not the own-vehicle velocity V is equal to or greater than a predetermined velocity V11 (step ST1411). If the own-vehicle velocity V is equal to or greater than the velocity V11, the process proceeds to step ST1421, and if the own-vehicle velocity V is smaller than the velocity V11, the process proceeds to step ST1451.

Next, the lean angle determination unit 112 determines whether or not the lean angle θ is equal to or greater than a predetermined positive angle θ11 (step ST1421). If the lean angle θ is equal to or greater than the angle θ11, the process proceeds to step ST1431, and if the lean angle θ is smaller than the angle θ11, the process proceeds to step ST1451.

Next, the duration time determination unit 113 determines whether the state in which the own-vehicle velocity condition in step ST1411 and the lean angle condition in step ST1421 are satisfied has continued for a predetermined period (step ST1431). If the state has continued for the predetermined period, it is determined that the own vehicle is "traveling on a right curve" (step ST1441), and the process is ended. If the state has not continued for the predetermined period, the process returns to step ST1411.

If at least one of the own-vehicle velocity condition in step ST1411 and the lean angle condition in step ST1421 is not satisfied, it is determined that the own vehicle is "not traveling on a right curve" (step ST1451), and the process is ended.

In the case of performing determination for traveling on a left curve, as shown in FIG. 7, first, the velocity determination unit 111 determines whether or not the own-vehicle velocity V is equal to or greater than a predetermined velocity V12 (step ST1412). If the own-vehicle velocity V is equal to or greater than the velocity V12, the process proceeds to step ST1422, and if the own-vehicle velocity V is smaller than the velocity V12, the process proceeds to step ST1452.

Next, the lean angle determination unit 112 determines whether or not the lean angle θ is equal to or smaller than a predetermined negative angle θ12 (step ST1422). If the lean angle θ is equal to or smaller than the angle θ12, the process proceeds to step ST1432, and if the lean angle θ is greater than the angle θ12, the process proceeds to step ST1452.

Next, the duration time determination unit 113 determines whether the state in which the own-vehicle velocity condition in step ST1412 and the lean angle condition in step ST1422 are satisfied has continued for a predetermined period (step ST1432). If the state has continued for the predetermined period, it is determined that the own vehicle is "traveling on a left curve" (step ST1442), and the process is ended. If the state has not continued for the predetermined period, the process returns to step ST1412.

If at least one of the own-vehicle velocity condition in step ST1412 and the lean angle condition in step ST1422 is not satisfied, it is determined that the own vehicle is "not traveling on a left curve" (step ST1452), and the process is ended.

As described above, in the determination for the curve traveling state, if the own-vehicle velocity V is smaller than a predetermined velocity, it is determined that the own vehicle is "not traveling on a curve".

In addition, since the duration time condition for the own-vehicle velocity condition and the lean angle condition is also taken into consideration in the determination for the curve traveling state, determination that "the own vehicle is traveling on a curve" is made only when the vehicle body has been continuously tilted in the same direction for a predetermined period.

As a result of the determination for the curve traveling state, if it is determined that the own vehicle 51 is traveling on a right curve or a left curve, the process proceeds to step ST16, and if it is determined that the own vehicle 51 is not traveling on a curve, the process proceeds to step ST18 (step ST15).

If it is determined that the own vehicle 51 is traveling on a curve, the radius-of-curvature calculation unit 12 calculates the radius of curvature R of the curve on which the own vehicle 51 is traveling (step ST16).

After calculation of the radius of curvature R, the other-vehicle lane estimation unit 13 estimates the traveling lane of the rearward detected vehicle 52A, 52B (step ST17), and outputs a result of the estimation as the lane information S. As described above, calculation of the radius of curvature R by the radius-of-curvature calculation unit 12 and lane estimation for another vehicle by the other-vehicle lane estimation unit 13 are performed only when it is determined that the own vehicle 51 is traveling on a curve. Thus, execution of unnecessary processing can be prevented. It is noted that, in the case of not traveling on a curve (case of traveling straight), the traveling lane of the rearward detected vehicle 52A, 52B can be detected from the position information about the rearward detected vehicle 52A, 52B acquired by the object information acquisition unit 91.

If the traveling lane of the rearward detected vehicle 52A, 52B is the same traveling lane as the traveling lane of the own vehicle 51 or is a traveling lane adjacent thereto, the process proceeds to step ST19. If the traveling lane of the rearward detected vehicle 52A, 52B is neither the same traveling lane as the traveling lane of the own vehicle 51 nor a traveling lane adjacent thereto, the rearward detected vehicle 52A, 52B is less likely to approach the own vehicle from the rear side or the lateral side. Therefore, it is determined that an approach alarm is not needed, and the process is ended (step ST18).

If the rearward detected vehicle 52A, 52B is traveling on the left adjacent lane 62A, the process proceeds to step ST20, and otherwise, the process proceeds to step ST21 (step ST19).

In the case where the rearward detected vehicle 52A, 52B is traveling on the left adjacent lane 62A, the alarm determination unit 141 outputs an alarm command J for "left adjacent lane approach alarm" to the alarm output unit 142. The alarm output unit 142 outputs the "left adjacent lane approach alarm" in accordance with the alarm command J (step ST20), and the process is ended.

If the rearward detected vehicle 52A, 52B is traveling on the right adjacent lane 62B, the process proceeds to step ST22, and otherwise, i.e., if the rearward detected vehicle 52A, 52B is traveling on the same traveling lane 61 as the own vehicle 51, the process proceeds to step ST23 (step ST21).

In the case where the rearward detected vehicle 52A, 52B is traveling on the right adjacent lane 62B, the alarm determination unit 141 outputs an alarm command J for "right adjacent lane approach alarm" to the alarm output unit 142. The alarm output unit 142 outputs the "right adjacent lane approach alarm" in accordance with the alarm command J (step ST22), and the process is ended.

If the rearward detected vehicle 52A, 52B is traveling on the same traveling lane 61 as the own vehicle 51, the alarm determination unit 141 outputs an alarm command J for "same lane approach alarm" to the alarm output unit 142. The alarm output unit 142 outputs the "same lane approach alarm" in accordance with the alarm command J (step ST23), and the process is ended.

According to the first embodiment, it is possible to properly output an alarm indicating that another vehicle is approaching during traveling on a curve. More specifically, the motorcycle driving assistance device is provided with the curve traveling determination unit which determines whether or not the own vehicle is traveling on a curve on the basis of the lean angle of the own vehicle, and the other-vehicle lane estimation unit which compares the radius of curvature and the distance between another vehicle that is an approach determination target and the center of curvature of the curve, and estimates the traveling lane of the other vehicle. Thus, even in the case of traveling on a curve where it is difficult to detect the traveling lane of another vehicle from only information of a detection sensor, the traveling lane of the other vehicle can be accurately estimated. As a result, the relationship between the traveling lane of the own vehicle and the traveling lane of the other vehicle can be more accurately grasped, and therefore, a necessary approach alarm is more reliably outputted while erroneous alarms are decreased. Thus, it is possible to more properly output an approach alarm regarding another vehicle during traveling on a curve.

In addition, in determination for the curve traveling state, when the own-vehicle velocity is smaller than a certain velocity, it is determined that the own-vehicle is "not traveling on a curve". Thus, falling of the motorcycle during stopping, such as "falling while standing", is prevented from being determined to be "traveling on a curve".

In addition, in determination for the curve traveling state, the motorcycle is determined to be "traveling on a curve" when the vehicle body has been continuously tilted in the same direction for a predetermined period. Therefore, a balancing action during traveling straight, such as slightly rocking the vehicle body rightward and leftward, is prevented from being determined to be "traveling on a curve".

Although the disclosure is described above in terms of an exemplary embodiment, it should be understood that the various features, aspects and functionality described in the embodiment are not limited in their applicability to the particular embodiment with which they are described, but instead can be applied alone or in various combinations to the embodiment of the disclosure.

It is therefore understood that numerous modifications which have not been exemplified can be devised without departing from the scope of the present disclosure. For example, at least one of the constituent components may be modified, added, or eliminated.

DESCRIPTION OF THE REFERENCE CHARACTERS

10 motorcycle driving assistance device
11 curve traveling determination unit
111 velocity determination unit
112 lean angle determination unit
113 duration time determination unit
12 radius-of-curvature calculation unit
13 other-vehicle lane estimation unit
14 alarm determination output unit
141 alarm determination unit
142 alarm output unit
51 own vehicle
52A, 52B rearward detected vehicle
61 traveling lane
62A left adjacent lane
62B right adjacent lane
91 object information acquisition unit
92 vehicle velocity information acquisition unit
93 lean angle information acquisition unit
J alarm command
R radius of curvature
S lane information
T determination result
V own-vehicle velocity
W lane width
θ lean angle

What is claimed is:

1. A motorcycle driving assistance device comprising:
a processor to execute a program; and
a memory to store the program which, when executed by the processor, performs processes of,
determining whether or not an own vehicle is traveling on a curve, on the basis of a lean angle of the own vehicle,
when it is determined that the own vehicle is traveling on a curve, calculating a radius of curvature of the curve on the basis of the lean angle and a velocity of the own vehicle,
comparing the radius of curvature and a distance between another vehicle that is an approach determination target and a center of curvature of the curve,
estimating a traveling lane of the other vehicle, and
determining whether or not an approach alarm is needed, on the basis of a distance between the own vehicle and the other vehicle, a relative velocity of the other vehicle relative to the own vehicle, and a relationship between a traveling lane of the own vehicle and the traveling lane of the other vehicle.

2. The motorcycle driving assistance device according to claim 1, wherein
the program, in performing the process of determining whether or not an own vehicle is traveling on a curve, performs process of,
determining that the own vehicle is traveling on a curve, when a vehicle body of the own vehicle has been continuously tilted in the same direction for a predetermined period.

3. The motorcycle driving assistance device according to claim 1, wherein
the program, in performing the process of determining whether or not an own vehicle is traveling on a curve, performs process of,
determining that the own vehicle is not traveling on a curve, when the velocity of the own vehicle is smaller than a predetermined velocity.

4. The motorcycle driving assistance device according to claim 2, wherein
the program, in performing the process of determining whether or not an own vehicle is traveling on a curve, performs process of,
determining that the own vehicle is not traveling on a curve, when the velocity of the own vehicle is smaller than a predetermined velocity.

5. The motorcycle driving assistance device according to claim 1, wherein
the program, in performing the process of determining whether or not an own vehicle is traveling on a curve, performs process of,
determining whether the own vehicle is traveling on a right curve or a left curve, on the basis of a direction in which a vehicle body of the own vehicle is tilted.

6. The motorcycle driving assistance device according to claim 2, wherein
the program, in performing the process of determining whether or not an own vehicle is traveling on a curve, performs process of,
determining whether the own vehicle is traveling on a right curve or a left curve, on the basis of a direction in which a vehicle body of the own vehicle is tilted.

7. The motorcycle driving assistance device according to claim 3, wherein
the program, in performing the process of determining whether or not an own vehicle is traveling on a curve, performs process of,
determining whether the own vehicle is traveling on a right curve or a left curve, on the basis of a direction in which a vehicle body of the own vehicle is tilted.

8. The motorcycle driving assistance device according to claim 4, wherein
the program, in performing the process of determining whether or not an own vehicle is traveling on a curve, performs process of,
determining whether the own vehicle is traveling on a right curve or a left curve, on the basis of a direction in which a vehicle body of the own vehicle is tilted.

9. The motorcycle driving assistance device according to claim 1, wherein
the program, in performing the process of determining whether or not an approach alarm is needed, performs process of,
when having determined that the approach alarm is needed, outputting an alarm command for performing output of the approach alarm recognizable by a driver of the own vehicle.

10. The motorcycle driving assistance device according to claim 2, wherein
the program, in performing the process of determining whether or not an approach alarm is needed, performs process of,
when having determined that the approach alarm is needed, outputting an alarm command for performing output of the approach alarm recognizable by a driver of the own vehicle.

11. The motorcycle driving assistance device according to claim 3, wherein
the program, in performing the process of determining whether or not an approach alarm is needed, performs process of,
when having determined that the approach alarm is needed, outputting an alarm command for performing output of the approach alarm recognizable by a driver of the own vehicle.

12. The motorcycle driving assistance device according to claim 4, wherein
the program, in performing the process of determining whether or not an approach alarm is needed, performs process of,
when having determined that the approach alarm is needed, outputting an alarm command for performing output of the approach alarm recognizable by a driver of the own vehicle.

13. The motorcycle driving assistance device according to claim 5, wherein
the program, in performing the process of determining whether or not an approach alarm is needed, performs process of,
when having determined that the approach alarm is needed, outputting an alarm command for performing output of the approach alarm recognizable by a driver of the own vehicle.

14. The motorcycle driving assistance device according to claim 6, wherein
the program, in performing the process of determining whether or not an approach alarm is needed, performs process of,
when having determined that the approach alarm is needed, outputting an alarm command for performing output of the approach alarm recognizable by a driver of the own vehicle.

15. The motorcycle driving assistance device according to claim 7, wherein
the program, in performing the process of determining whether or not an approach alarm is needed, performs process of,
when having determined that the approach alarm is needed, outputting an alarm command for performing output of the approach alarm recognizable by a driver of the own vehicle.

16. The motorcycle driving assistance device according to claim 8, wherein
the program, in performing the process of determining whether or not an approach alarm is needed, performs process of,
when having determined that the approach alarm is needed, outputting an alarm command for performing output of the approach alarm recognizable by a driver of the own vehicle.

* * * * *